United States Patent
Mahmoud (10) Patent No.: US 7,549,020 B2
(45) Date of Patent: *Jun. 16, 2009

(54) METHOD AND APPARATUS FOR RAID ON MEMORY

(75) Inventor: Fadi Mahmoud, Livermore, CA (US)

(73) Assignee: Adaptec, Inc., Milpitas, CA (US)

(*) Notice: Subject to any disclaimer, the term of this patent is extended or adjusted under 35 U.S.C. 154(b) by 20 days.

This patent is subject to a terminal disclaimer.

(21) Appl. No.: 11/873,334

(22) Filed: Oct. 16, 2007

(65) Prior Publication Data

US 2008/0163385 A1 Jul. 3, 2008

Related U.S. Application Data

(62) Division of application No. 10/185,307, filed on Jun. 27, 2002, now Pat. No. 7,293,138.

(51) Int. Cl.
*G06F 12/00* (2006.01)

(52) U.S. Cl. .......................... 711/114; 714/6

(58) Field of Classification Search ............... 711/114; 714/6
See application file for complete search history.

(56) References Cited

U.S. PATENT DOCUMENTS

| 7,293,138 B1 * | 11/2007 | Mahmoud ............... 711/114 |
| 2003/0088735 A1 * | 5/2003 | Busser et al. ............ 711/114 |
| 2003/0088805 A1 * | 5/2003 | Majni et al. ............. 714/6 |

* cited by examiner

*Primary Examiner*—Kevin L Ellis
*Assistant Examiner*—Hashem Farrokh
(74) *Attorney, Agent, or Firm*—Martine Penilla & Gencarella, LLP.

(57) ABSTRACT

A method for protecting memory is provided. The method includes reading a block of data from a storage drive and writing the block of data to a first memory portion and a second memory portion. The method also includes managing the first memory portion and the second memory portion to protect the block of data. The block of data can be recovered from a non-failing portion in case either the first memory portion or the second memory portion fails.

16 Claims, 13 Drawing Sheets

METHOD AND APPARATUS FOR RAID ON MEMORY

CLAIM OF PRIORITY

This application is a divisional application claiming priority under 35 U.S.C. § 120 of U.S. patent application Ser. No. 10/185,307, entitled "Method and Apparatus for RAID on Memory," filed on Jun. 27, 2002, now U.S. Pat. No. 7,293,138 which is incorporated herein by reference.

BACKGROUND OF THE INVENTION

1. Field of the Invention

The present invention relates generally to the field of computing technology, and more particularly, to methods and structures for optimizing the performance and fault tolerance of a computing system.

2. Description of the Related Art

As is well known, computer systems typically include a processor, a main memory, and a secondary storage memory. Normally, the processor is a Central Processing Unit (CPU) or a microprocessor, the main memory is Random Access Memory (RAM), and the secondary storage is a hard disk drive. As the information such as data and instructions in RAM and the hard disk drives are executed by the processor, data protection has become one of the chief concerns in designing RAM and hard disk drives. Specifically, data protection is important as valuable data stored in hard disk drives, or temporarily held in RAM, can be lost due to abnormal occurrences such as human errors, equipment failures, and adverse environmental conditions.

Figure 1:
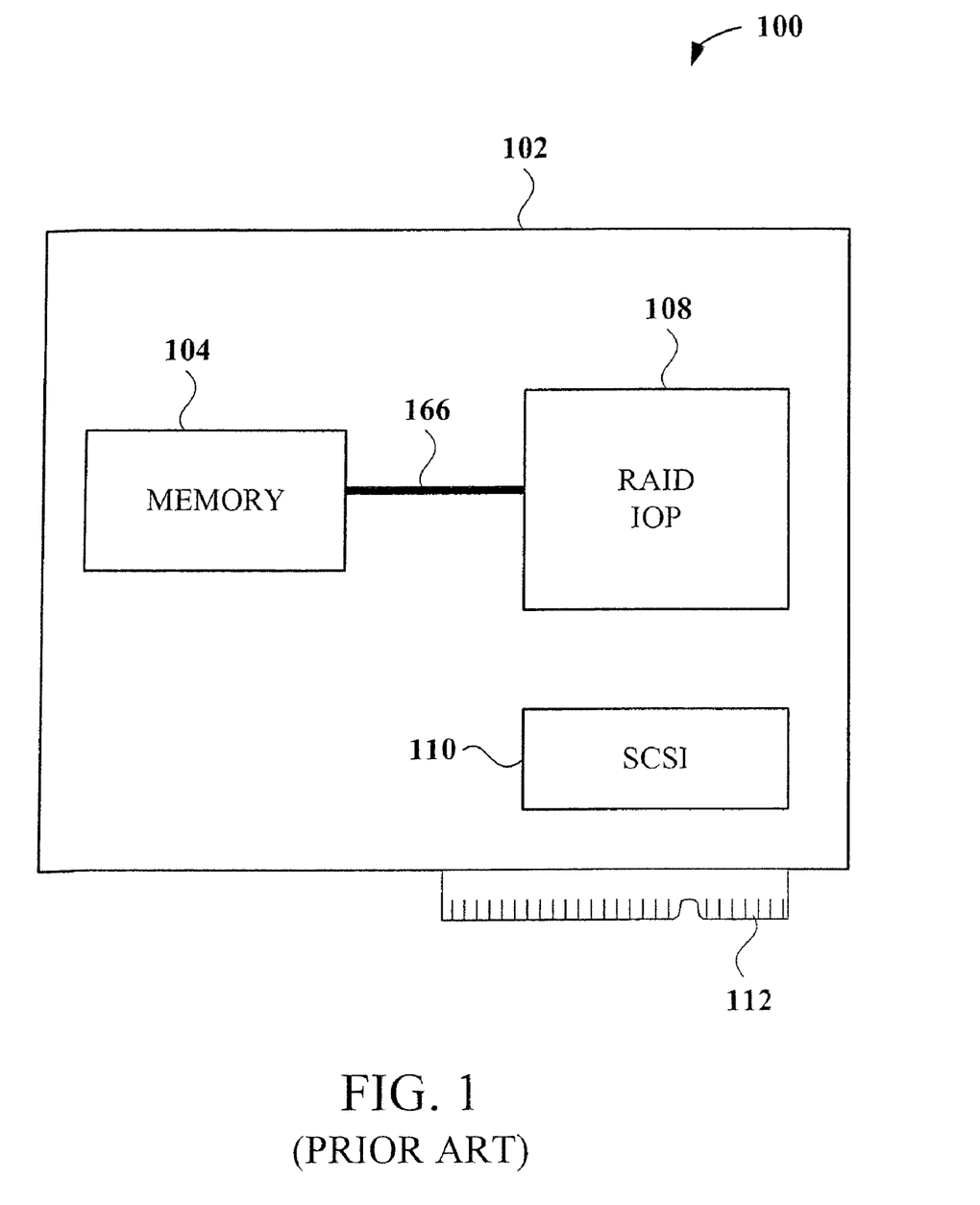
FIG. 1 illustrates a simplified block diagram of a host adapter card in accordance with the prior art.

FIG. 1 illustrates a simplified schematic diagram of a host adapter card 102 of the prior art as it includes a dedicated memory 104, a Redundant Array of Independent Disks (RAID) Input/Output Processor (RAID IOP) adapter chip 108, and a Small Computer System Interface (SCSI) host adapter chip 110. As shown, the host adapter card 102 is designed to be plugged into the primary PCI bus using a plug 112. As also shown, the RAID IOP is coupled to the dedicated memory 104 through a bus 106.

Typically, the dedicated memory 104 can be either soldered to the motherboard or be a Dual In-Line Memory Module (DIMM) that is plugged onto the host adapter card 102 or a memory chip (not shown in the Figure). Irrespective of being soldered to the motherboard or being a DIMM, the larger the size of the dedicated memory 104 is, the better the performance of the computer system will be. For that reason, use of larger memory sizes has become a predominate trend. DIMMs have specifically played a significant role in promoting the use of expanded memory, because additional DIMMs can be added as a need for additional memory arises.

Despite its advantages, using DIMMs has proven to be less than reliable. That is, despite using multiple DIMMs, the failure of one DIMM to function properly is disastrous and costly, as it results in system shut down. In one example, specifically, the failure of one DIMM used on the host adapter card results in the failure of the host adapter card 102, which ultimately causes corruption of data. In such situation, the entire computing system must be shut down causing a significant loss. Additionally, shutting down the entire computer system further creates unknown effects on system components and data stored therein. Furthermore, eliminating the problem requires the replacement of the DIMM, subsequent to which, requires the reconfiguration of the entire system.

In view of the foregoing, there is a need for a new methodology and apparatus for improving the performance and fault tolerance of computer systems through improving data integrity.

SUMMARY OF THE INVENTION

Broadly speaking, the present invention fills these needs by providing an apparatus and methods for improving the performance and increasing the fault tolerance of a computing system by using Redundant Array of Independent disks (RAID) on memory. In one implementation, the embodiments of present invention implement RAID on a dedicated memory of a host adapter card. It should be appreciated that the present invention can be implemented in numerous ways, including as a process, an apparatus, a system, a device, or a method. Several inventive embodiments of the present invention are described below.

In one embodiment, a method for protecting memory is provided. The method includes reading a block of data from a storage drive. The method also includes writing the block of data to a first dual in-line module (DIMM) and a second DIMM plugged onto a single host adapter card coupled to the storage drive. The first DIMM and the second DIMM are coupled to a single Redundant Array of Independent Disks (RAID) controller on the single host adapter card. The method further includes managing the first DIMM and the second DIMM to protect the block of data. The block of data can be recovered from a non-failing DIMM in case either the first DIMM or the second DIMM fails.

In another embodiment, a system for increasing a performance and fault tolerance of a computer system is provided. The system includes a set of storage drives configured to store data. The system further includes a first DIMM and a second DIMM protected by Redundant Array of Independent Disks (RAID), wherein the first DIMM and the second DIMM are plugged onto a host adapter card. In addition, the system includes a single RAID controller configured to store data in the set of storage drives into the first DIMM and the second DIMM. The first DIMM and the second DIMM are coupled to the single RAID controller. The single RAID controller is further configured to redundantly protect data stored into the first DIMM and the second DIMM. The single RAID controller is integrated on the host adapter card.

The advantages of the present invention are numerous. Most notably, RAID on memory significantly increases system performance and the reliability of data in a computer system. For instance, the RAID level 0 on a host adapter card significantly improves the performance of the computer system. In one example, this occurs by using parallel reading and caching of data from a hard disk drive into a plurality of DIMMs or a plurality of virtual memory partitions. Another advantage of the present invention is that by using the RAID level 1 on memory, the highest reliability of data can be provided. Yet another advantage of performing RAID on memory is that by implementing multiple memory chips (e.g., DIMMs) to construct a dedicated array RAID array of memory on a host adapter card, the embodiments of the present invention facilitate performing of hot plugging on a faulty memory chip (e.g., DIMM). In this manner, the embodiments of the present invention substantially eliminate down time associated with shutting down the entire computing system to replace faulty memory.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

An invention for computer implemented methods for increasing the performance and the fault tolerance of a computing system through ensuring integrity of data, is provided. Preferably, the embodiments of the present invention implement Redundant Array of Independent (Inexpensive) Disks (RAID) on Memory to improve the performance and the reliability of data in a dedicated memory of a host adapter card. In one example, RAID on memory includes a plurality of virtual memory partitions. In a different implementation, RAID on memory includes a plurality of memory chips. In one example, the memory chips implemented are DIMMs.

By way of example, in a RAID level 0 on memory data, within a hard disk drive is stripped between a plurality of DIMMs, or a plurality of virtual memory partitions. In a different example, a RAID level 1 on memory, data within a hard disk is read and cached into a pair of DIMMs or two virtual memory partitions. Preferably, implementing multiple DIMMs enables the hot plugging of a faulty DIMM.

Figure 2:
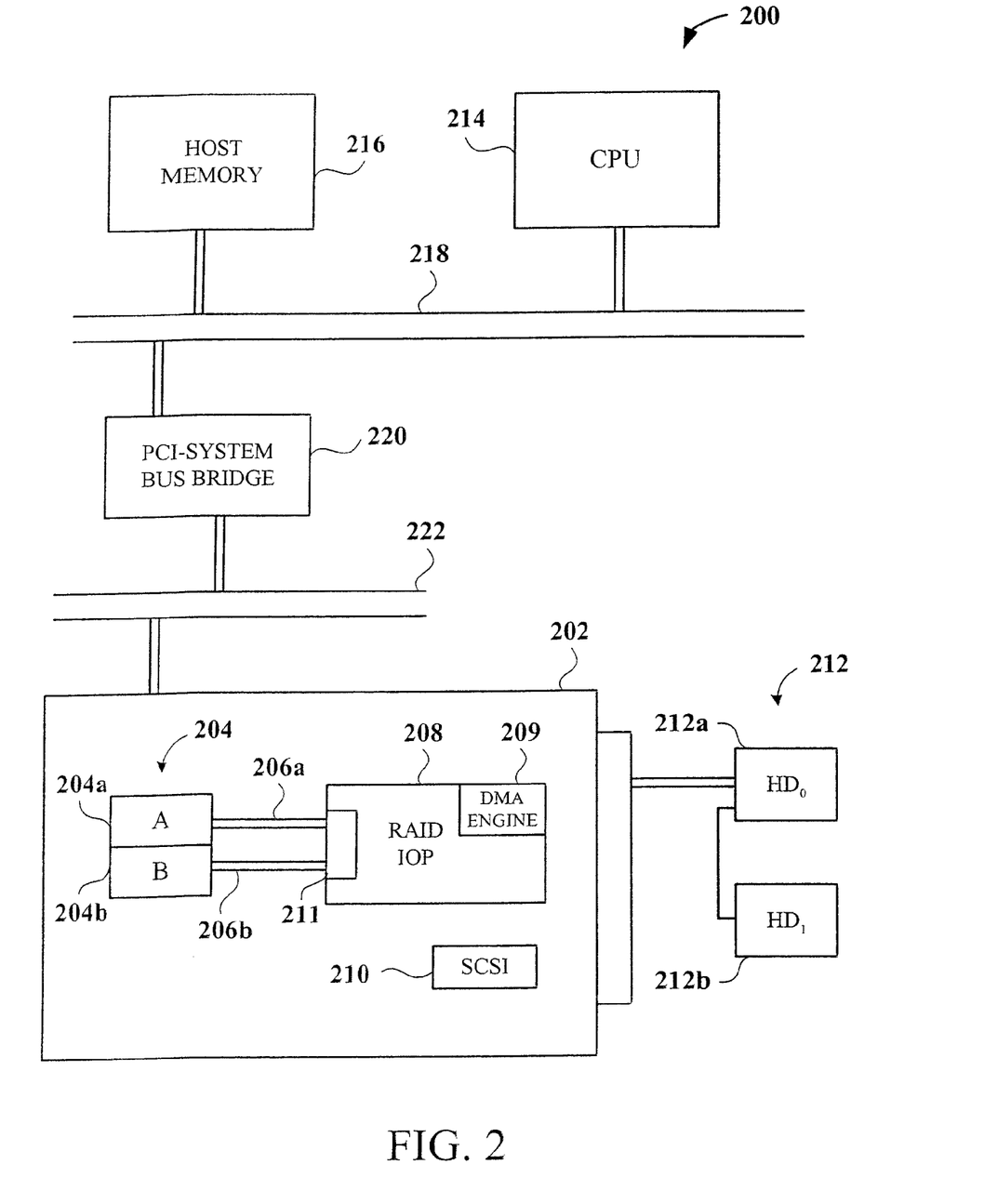
FIG. 2 depicts a simplified schematic diagram of a computer system having a RAID array of virtual dedicated memory partitions, in accordance with one embodiment of the present invention.

Reference is now made to FIG. 2 illustrating a simplified schematic diagram of a computer system 200 having a RAID on memory including a plurality of dedicated virtual memory partitions 204a and 204b, in accordance with one embodiment of the present invention. The computer system 200 includes a host processor 214, a primary Peripheral Component Interconnect (PCI) bus 218, a host memory 216, a host adapter card 202, and a RAID array of hard disk drives 212. The host processor 214 and the host memory 216 are coupled to the primary PCI bus 218. The host processor 214 processes information such as data and instructions while the host memory 216 stores and provides information to the processor 214.

The primary PCI bus provides a high speed data path between the CPU 214 and the connected peripheral devices so as to provide additional functionality. For instance, the RAID array of hard disk drives 212 is connected to the primary PCI 218 through a host adapter card 202. The host adapter card 202 is coupled to a secondary PCI bus 222 that is coupled to the PCI-system bus bridge 220. The host adapter card 202 is configured to interface and control access to the RAID array of hard disk drives 212. The host adapter card 202 includes a RAID Input/Output Processor (RAID IOP) 208, a dedicated memory 204, and a SCSI controller 210.

The RAID IOP 208 includes a Direct Memory Access (DMA) engine 209 configured to transfer data from the RAID array of hard disk drives 212 to one or more of virtual memory partitions 204a and 204b of the RAID array of virtual memory partitions 204. In one example, the DMA engine has multi-channels thus allowing parallel transfer of data from any of the hard disk drives 212a and 212b to any of virtual memory partitions 204a and 204b of the RAID array of virtual memory partitions 204. In one embodiment, the RAID IOP further includes a memory controller 211 configured to interface and control access to the virtual memory partitions 204a and 204b of the RAID array of virtual memory partitions 204.

Figure 3A:
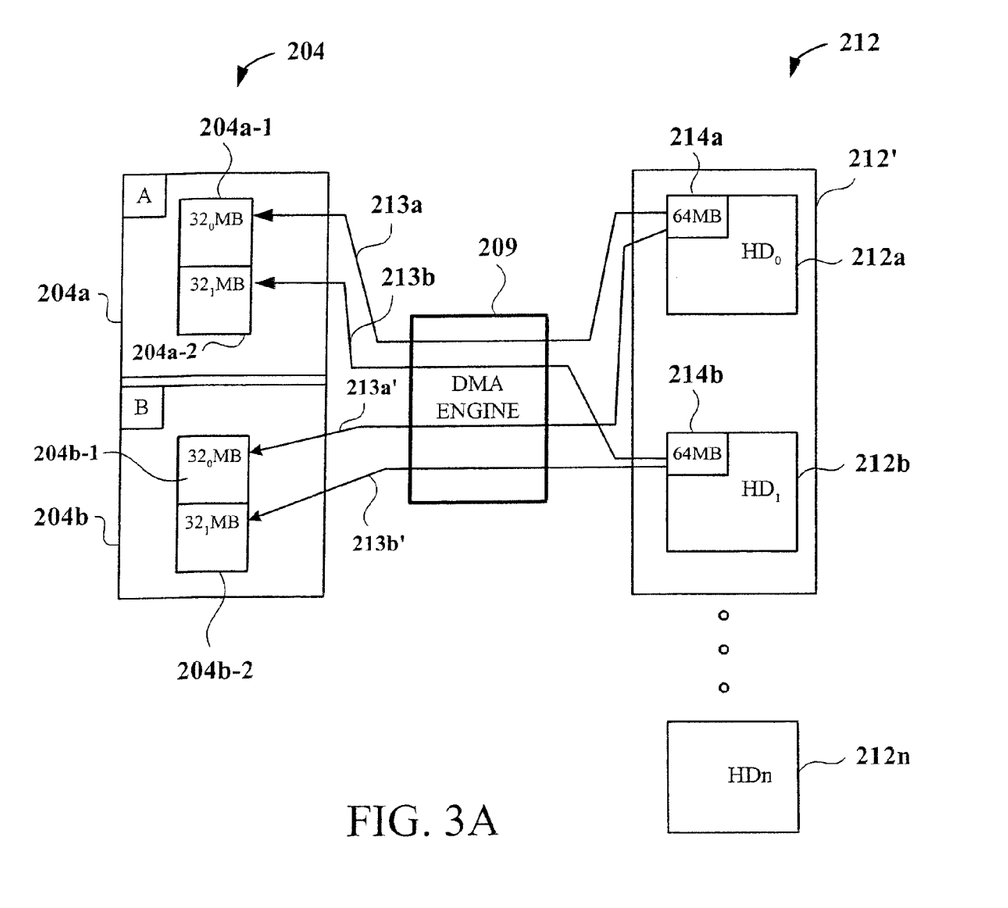
FIG. 3A is a simplified schematic diagram illustrating the achievement of higher performance through striping of data using RAID array of dedicated memory partitions, in accordance with yet another embodiment of the present invention.

Achieving higher performance through striping of data using RAID array of dedicated memory partitions 204 can further be understood with respect to the simplified schematic diagram shown in FIG. 3A, in accordance with one embodiment of the present invention. As shown, data stored in the RAID array of hard disk drives 212 is cached into the RAID array of dedicated memory partitions 204. The RAID array of hard disk drives 212 includes a plurality of hard disk drives 212a through 212$_n$. One container 212' shows two hard drives 212a and 212b respectively transferring 64 Mbytes of data in portions 214a and 214b using a stripping technique. Each portion 214a and 214b writes 32 Mbytes of data in 204a-1 and 204b-1, and 204a-2 and 204b2 of virtual memory partitions 204a and 204b, correspondingly.

In one exemplary embodiment, a plurality of parameters of a desired memory RAID level is provided to the DMA engine 209 of the RAID IOP 208. For instance, in the embodiment of FIG. 3A, a desired RAID level 0, which is memory striping, is provided to the RAID IOP 208. That is, data stored in the RAID array of hard disk drives 212 are interleaved across multiple virtual memory partitions 204a and 204b, providing increased performance.

As shown, a portion of the hard disk drive 212a of the RAID array of hard disk drives 212 operates on data sectors totaling 64 MB, which under RAID on memory level 0 is configured to be stripped between the virtual memory partition 204a and 204b, equally. That is, the data contents of the portion 214a of the hard disk drive 212a is read and subsequently interleaved equally between the virtual memory partitions 204a and 204b. By way of example, using 213a, a first 32 Mbytes of data in the hard disk 212a is read and then cached in 204a-1 of the virtual memory partition 204a. Then, using the 213a', a second 32 Mbytes of data in the hard disk drive 212a is read and cached in 204b-1 of the virtual memory partition 204b. Similarly, a first portion of data stored within hard disk drive 212b is read and cached in 204a-2 of virtual memory partition 204a using 213b. In a like manner, a second portion of data stored within the hard disk drive 212b is read and cached into a 204b-2 of the virtual memory partition 204b.

In one example, the DMA engine is designed such that it is multi-channeled giving the DMA engine the capability to transfer the first and second portions of data within the hard disk drive 212a in parallel. In this manner, advantageously, the period of time required to read the entire 64 Mbytes of data stored within the hard disk drive 212a is reduced substantially by half. In a like manner, reading of the first and second portions of data stored within the hard disk drive 212b and caching same into the first and second virtual memory partitions is reduced substantially by half.

Additionally, it must be noted that in a different embodiment, the time required to read data stored in each of the hard disk drives 212a and 212b may be reduced by caching the stored data within each of the hard disk drives 212a and 212b into three or four (i.e., more than two) virtual memory partitions. In this manner, the time required to read the 64 Mbytes of data stored in each portion 214a and 214b of the corresponding hard disk drives 212a and 212b can be reduced by one-third and one-fourth, respectively.

Figure 3B:
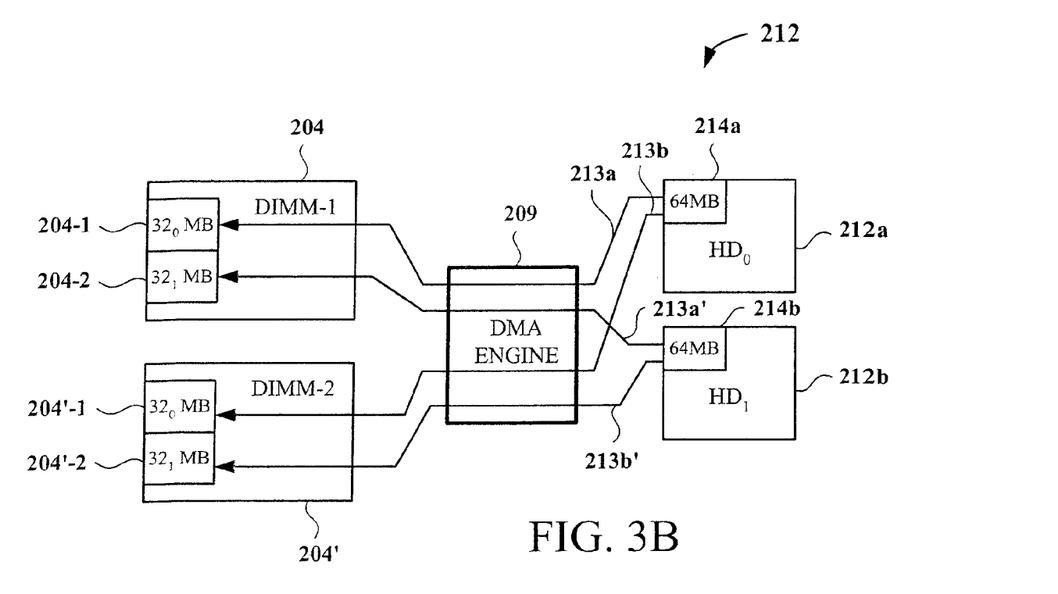
FIG. 3B is a simplified schematic diagram showing a plurality of DIMMs forming a RAID array of memory, in accordance with still another embodiment of the present invention.

In a different implementation, as shown in FIG. 3B, a plurality of DIMMs 204 and 204' can be used to cache data read from each of the hard disk drives 212a and 212b, in accordance with one embodiment of the present invention. In this example, the first portion of the 64 Mbytes data stored in the hard disk drive 212a is read and then cached into a 204-1 of a DIMM 204 using 213a. In a same manner, the second portion of data stored in hard disk drive 212a is read and cached into a 204'-1 of a DIMM 204' using 213a'. As shown, as a result of being multi-channeled, the DMA engine 209 is capable of reading the first portion and the second portion of data in the hard disk drive 212a in parallel, reducing the time required for caching the entire data by half.

Similarly, the first portion of data stored in the hard disk drive 212b is read and then cached into 204-2 of DIMM 204 using 213a'. Then, the second portion of data stored in the second hard disk drive 212b is read and cached into 204'-2 of DIMM 204' using 213b'. Thus, again, the multi-channel DMA engine 209 enables the parallel reading of the first and second portions of the hard disk drive 212b as well as parallel caching of the first and second portions of the data in 204-2 of DIMM 204 and 204'-2 of DIMM 204'. Data read from each of the hard disk drives 212a and 212b is beneficially interleaved between two DIMMs, in parallel, thus reducing the time required to read and write data substantially by half.

It must be noted that although the embodiments of the present invention are shown to include DIMMs, one having ordinary skill in the art should appreciate that any suitable memory chip can be implemented to store data (e.g., memory sticks, Single In-line Memory Module (SIMMs), etc.)

Figure 3C:
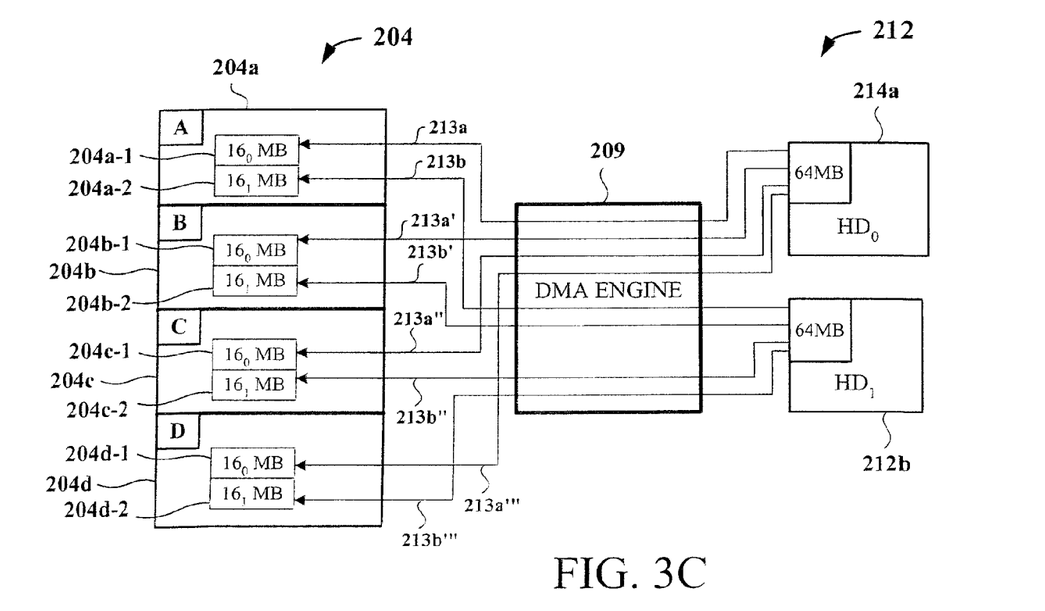
FIG. 3C is a simplified schematic diagram depicting striping of data from a RAID array of hard disks into a RAID array of virtual memory partitions, in accordance with still another embodiment of the present invention.

Reference is made to FIG. 3C depicting the striping of data from the RAID array of hard disk drives 212 into a RAID array of virtual memory partitions 204, in accordance with one embodiment of the present invention. As shown, the memory 204 has been virtually divided into four partitions of 204a through 204d. In one example, a first portion of data stored within the hard disk drive 212a is cached and stripped into 204a-1, the second portion of data stored within the hard disk drive 212a is cached and interleaved into 204b-1, a third portion of data stored within the hard disk drive 212a is cached and interleaved into 204c-1, and a fourth portion of data stored within the hard disk drive 212a is cached and interleaved into 204d-1, respectively.

Similarly, the first portion of data stored within the hard disk drive 212b is cached and interleaved into the 204a-2 of the first virtual memory partition 204a, the second portion of data stored within the hard disk drive 212b is cached and interleaved into the 204b-2 of the second virtual memory partition 204b, the third portion of data stored within the hard disk 212b is cached and interleaved into 204c-2 of the third virtual memory partition 204c, and the fourth portion of data stored within the hard disk 212b is cached and interleaved into 204d-2 of the fourth virtual memory partition 204d, correspondingly.

In one exemplary embodiment, each of the first portions of the hard disks 212a and 212b are cached into 204a-1 and 204a-2 using 213a and 213b. In a like manner, each of the second portions of the hard disks 212a and 212b are cached into 204b-1 and 204b-2 using 213a' and 213b'; each of the third portions of the hard disks 212a and 212b are cached into 204c-1 and 204c-2 using 213a'' and 213b''; and each of the fourth portions of the hard disks 212a and 212b are cached into 204d-1 and 204d-2 using 213a''' and 213b'''. This is specifically made possible by the multi-channel DMA engine capable of reading and caching data from multiple hard disk drives into multiple virtual memory partitions of the memory.

Figure 4A:
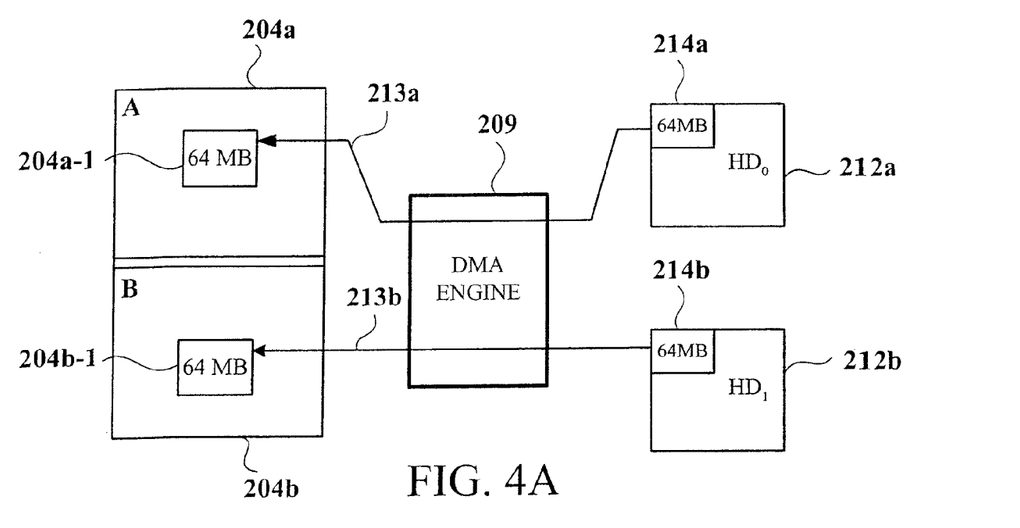
FIG. 4A is a simplified schematic diagram illustrating a RAID level 1 on memory, in accordance with yet another embodiment of the present invention.

Turning to FIG. 4A, implementing a RAID level 1 on memory can further be understood, in accordance with one embodiment of the present invention. The RAID level 1 on memory is mirroring which is one-hundred percent duplication of data within the disks. In the embodiment of FIG. 4A, data within the hard disk drive 212a and 212b are duplicates, providing higher system reliability. In accordance to one example, data stored within the hard disk drive 212a (e.g., a data portion 214a of 64 MB) is read and cached into the first virtual memory partition 204a. Similarly, data stored within the hard disk drive 212b (e.g., a data portion 214b of 64 MB) is read and cached into the virtual memory partition 204b, in parallel. As discussed in more detail above, parallel caching of data stored within the hard disk drives 212a and 212b has been made possible using the multi-channel DMA engine 209 and the virtual splitting of the memory into two virtual partitions, each having a size of 64 MB. Each of the first and second memory partitions 204a and 204b having the size of 64 Mbytes is capable of caching in 64 Mbytes of data, which in this embodiment, are identical. Of course, memory can have much larger sizes, but for purposes of example, 64 Mbytes is used.

In this manner, data duplicated within the hard disk drives 212a and 212b are also duplicated in virtual memory partitions 204a and 204b, increasing the reliability of the system. As a consequence, a corruption of data cached into the second virtual memory partition 204b will have no significant negative effect, as an identical copy of the data is cached into the first virtual memory partition 204a. Thus, the RAID level 1 on memory of the present invention beneficially increases the fault tolerance of the system.

Figure 4B:
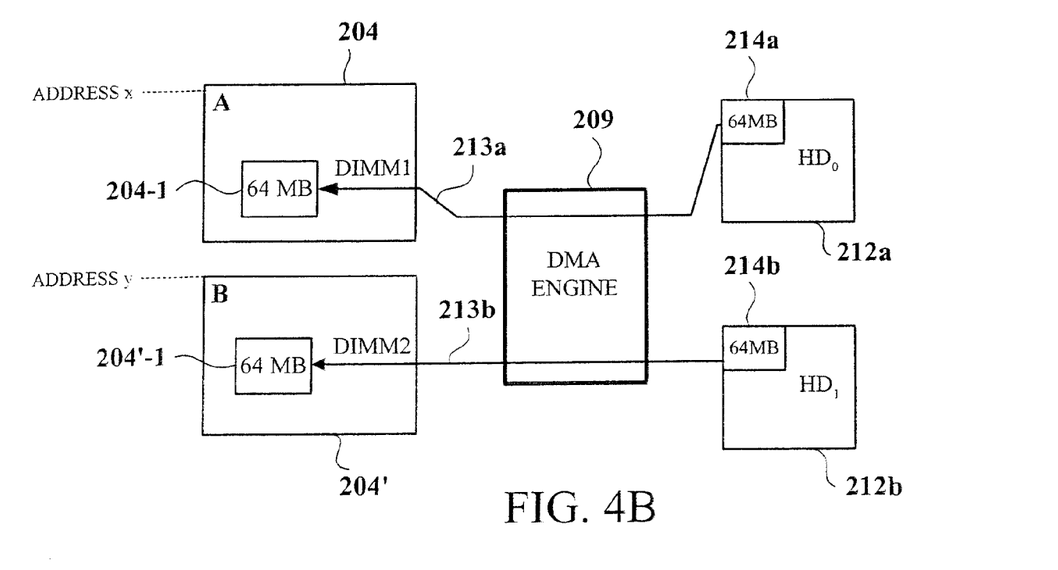
FIG. 4B is a simplified schematic diagram illustrating caching of data from a RAID level 1 on hard disk drives to a RAID level 1 on memory constructing from a multiple DIMMs, in accordance with yet another embodiment of the present invention.

In a different example, as shown in FIG. 4B, multiple DIMMs can be implemented to cache duplicated data stored within the hard disk drives 212a and 212b using the RAID level 1 on memory of the present invention, in accordance with one embodiment of the present invention. As illustrated, data portion 214a stored within the hard disk drive 212a having a size of 64 Mbytes or larger is read and cached into a first DIMM 204 while data portion 214b stored within the hard disk drive 212b is read and cached into the second DIMM 204'. Each of the first DIMM and the second DIMM 204 and 204' has a size of 64 Mbytes, as shown in 204-1 and 204'-1 and each has a respective address of X and Y. That is, when different DIMMs are implemented to cache duplicated data, the caching of data is facilitated by using each of the addresses of the first and second DIMMs 204 and 204'. Again, in this embodiment, duplicated data stored within the hard disk drives 212a and 212b are cached into two different DIMMs 204 and 204', despite the data within the two hard disk drives 212a and 212b being duplicate. In this manner, corruption of data within the first and second DIMMs 204 or 204', respectively, has a minimal negative effect on the system.

Figure 5:
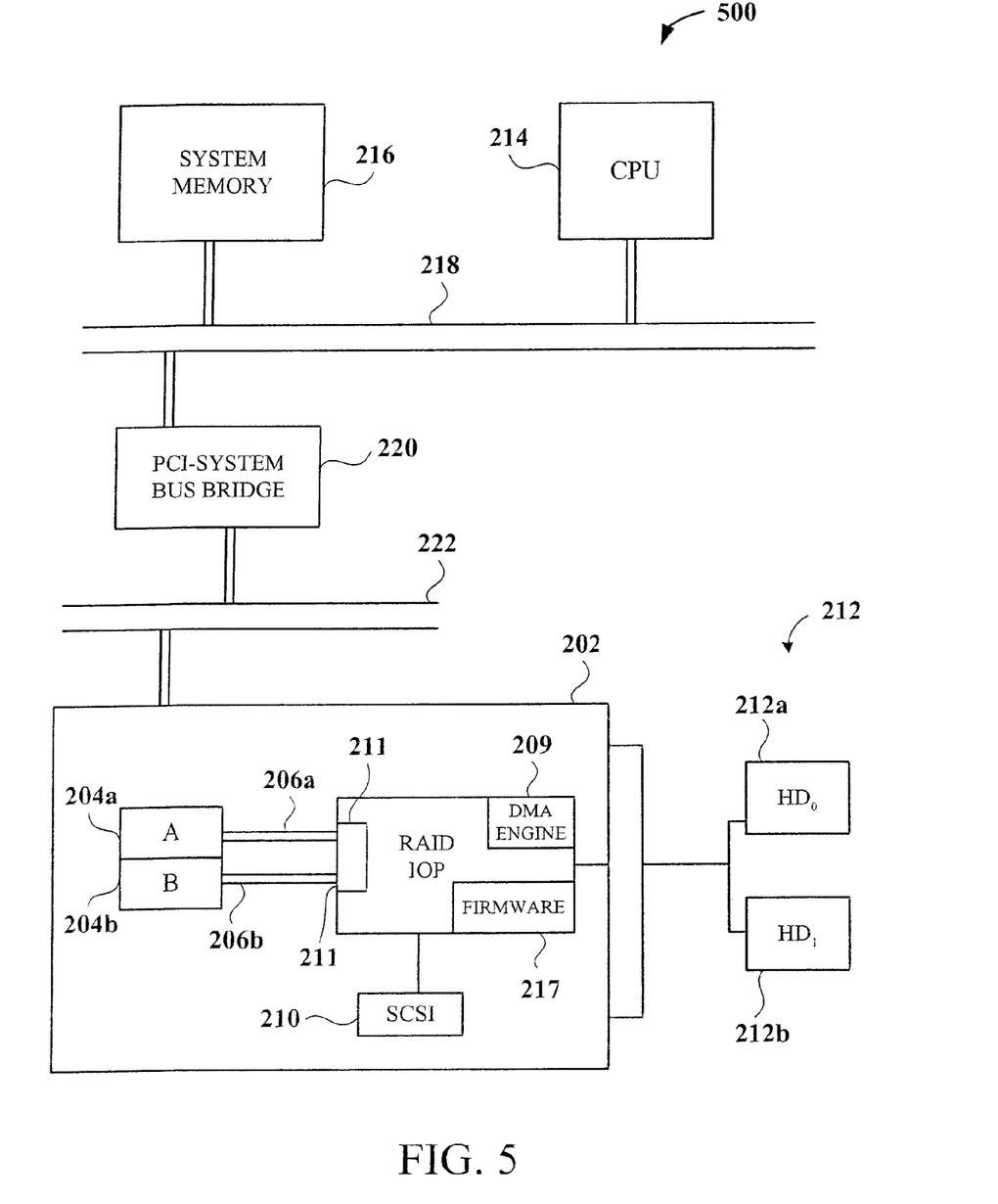
FIG. 5 is a simplified schematic diagram of a computer system including a plurality of dedicated virtual memory partitions, in accordance with yet another embodiment of the present invention.

A simplified schematic diagram of a computer system 500 having a RAID array on memory of a plurality of virtual memory partitions 204a and 204b is illustrated in FIG. 5, in accordance with one embodiment of the present invention. The computer system 500 includes a host processor (CPU) 214, a primary Peripheral Component Interconnect (PCI) bus 218, a host memory 216, a host adapter card 202, and a RAID array of hard disk drives 212. The primary PCI bus provides a high speed data path between the CPU 214 and the connected peripheral devices. The RAID array of hard disk drives 212 is connected to the primary PCI 218 through a host adapter card 202. The secondary PCI bus 222 is coupled to the PCI-system bus bridge 220. The host adapter card 202 interfaces and controls access to the RAID array of hard disk drives 212.

The host adapter card 202 includes a RAID Input/Output Processor (RAID IOP) 208, a RAID array of dedicated memory 204, and a SCSI controller 210. The RAID IOP 208 includes a Direct Memory Access (DMA) engine 209, firmware 217, and a controller 211. The DMA engine is configured to transfer data from the RAID array of hard disk drives 212 to one or more of virtual memory partitions 204a and 204b of the dedicated RAID array of memory 204. In one example, the DMA engine 209 has multi-channels, thus allowing parallel transfer of data from any of the hard disk drives 212a and 212b to any of virtual memory partitions 204a and 204b of the dedicated RAID array of memory 204. The memory controller 211 interfaces and controls access to the virtual memory partitions 204a and 204b of the dedicated RAID array of memory 204 implementing 206a and 206b, respectively.

The firmware 217 is a software interface configured to run on the RAID IOP. In one example, the RAID parameters (e.g., RAID level, necessary number of virtual memory partitions, number of containers, etc.) are defined by the firmware 217. The firmware 217 then implements the parameters to virtually split the dedicated memory 204. Thus, the firmware 217 is aware of the number of virtual memory partitions and their associated addresses.

Figure 6:
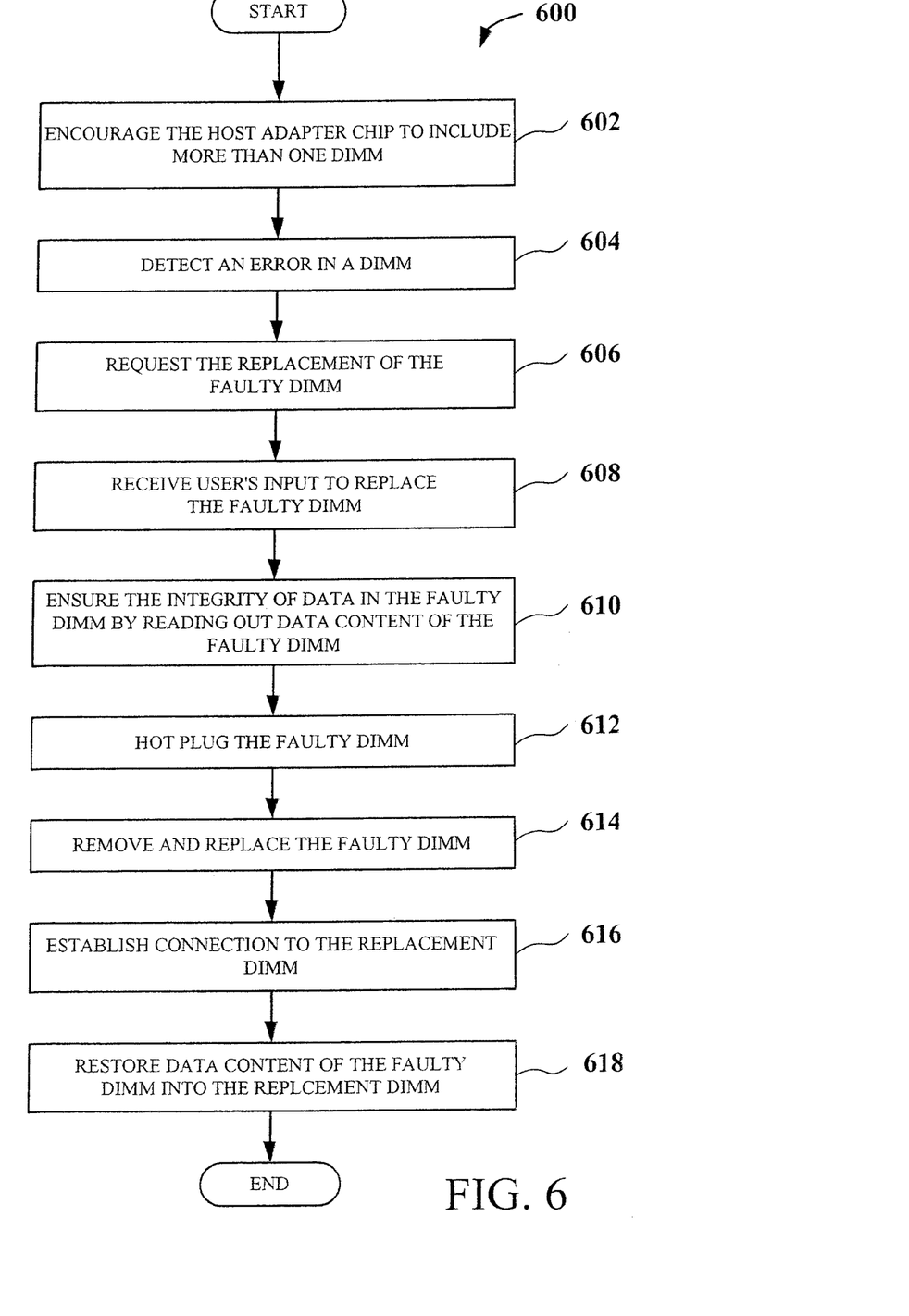
FIG. 6 is a flowchart diagram of method operations performed in hot plugging a faulty DIMM, in accordance with yet another embodiment of the present invention.

FIG. 6 illustrates a flow chart 600 of method operations performed in hot plugging a faulty DIMM, in accordance with one embodiment of the present invention. The method begins in operation 602 in which the host adapter card is configured so as to include more than one DIMM. Then, in operation 604, an error is detected in one of the DIMMs. For instance, depending on the situation, the error may be having a faulty DIMM or having corrupted data on one of the DIMMs. Proceeding to operation 604, it is determined that the error is due to having a faulty DIMM.

Upon making such detection, in operation 608, a user's input to replace the faulty DIMM is received. In one example, the user is configured to interact using a RAID interface software such as Storage Manager Professional (SMPro) or Storage Manager on ROM (SMOR), both of which are RAID software interfaces developed by Adaptec of Milpitas in California.

Continuing to operation 610, the integrity of data in the faulty DIMM is ensured by reading out data content of the faulty DIMM. Next, in operation 612, the faulty DIMM is hot plugged. As used herein, "hot plugging a DIMM" is defined as shutting down the power to the existing DIMM in the computer system thus allowing the removal of same while the computer system power and the host adapter card power are still on and operating. Thus, in operation 612, the power to the faulty DIMM is shut down, which in one embodiment, is performed by the firmware.

Next, in operation 614, the faulty DIMM is removed and replaced. Upon replacing the faulty DIMM, in operation 616, connection is established to the replaced DIMM. In one instance, the firmware restores power to the replaced DIMM. Then, in operation 618, the data content of the faulty DIMM is restored into the replacement DIMM. In this manner, the integrity of data cached into a plurality of DIMMs forming a RAID array of memory is beneficially ensured without the necessity of shutting down the power to the entire system.

Figure 7:
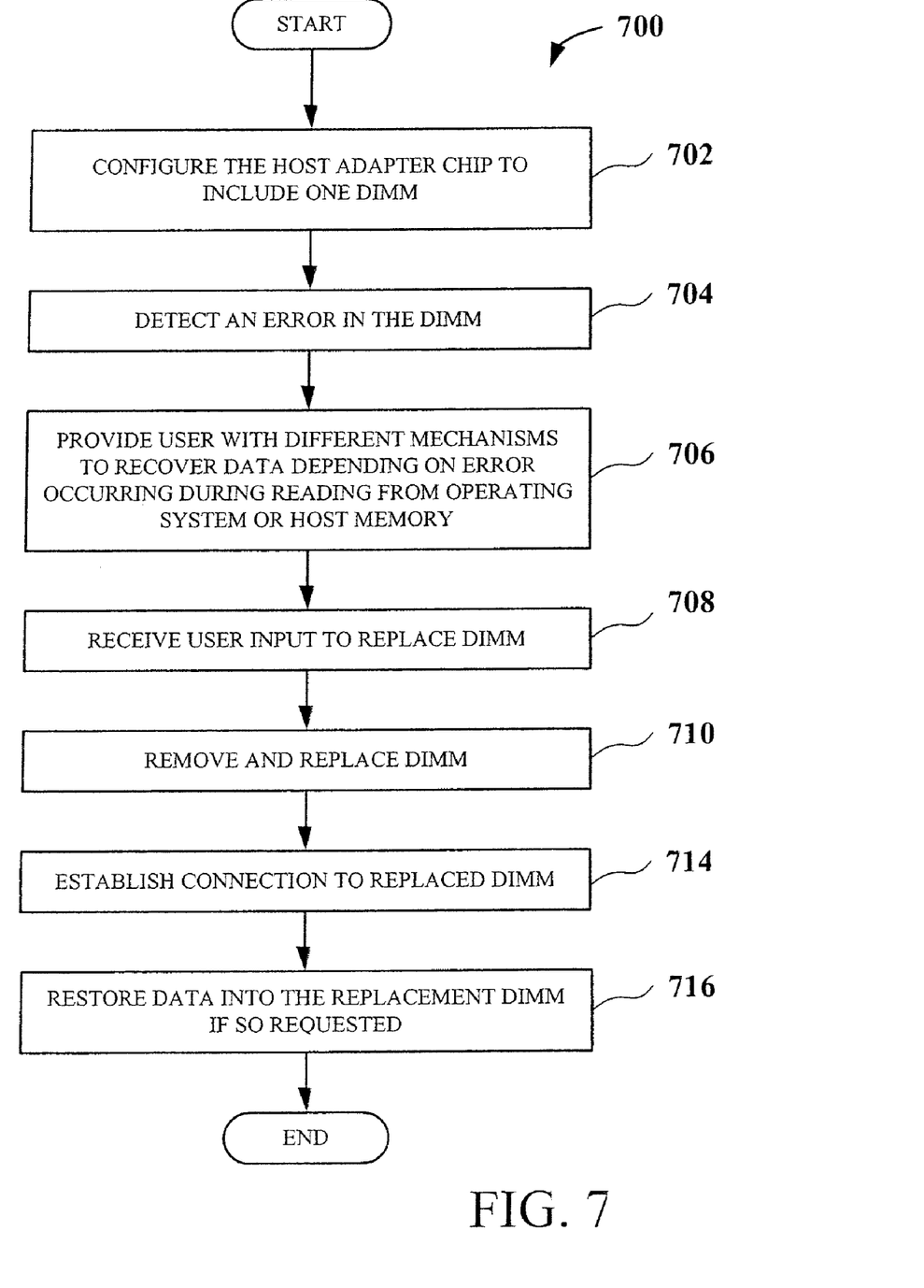
FIG. 7 is a flowchart diagram of method operations performed in hot plugging a single DIMM, in accordance with yet another embodiment of the present invention.

Turning to flowchart diagram 700 of method operations shown in FIG. 7, hot plugging a DIMM can further be understood, in accordance with one embodiment of the present invention. The method begins in operation 702, in which the host adapter card is configured to include a single DIMM followed by operation 704 wherein an error is detected in the DIMM. In one instance, it may be detected that the DIMM is faulty while in a different embodiment, it may be determined that data to be cached into the DIMM is corrupted. Next, in operation 706, the user is provided with different mechanisms to recover data in the DIMM, depending on the error occurring during reading of data from the host memory or from the operating system. For instance, the error may have occurred during reading of data from the operating system in the computer system that includes RAID on hard disk drives. In such situation, if RAID level 0 is implemented, the portion of valid data that is still available is recovered and the user is informed of the loss of a portion of the data. If RAID level 1 is implemented, the copy of the data is implemented to restore the data in the faulty DIMM. If RAID level 5 is used, the lost data is regenerated. In a different scenario, where error has occurred during reading of data from host memory, a copy of the data may be recovered using the data in the host memory.

Continuing to operation 708, the user input to replace the DIMM is received. In one example, the interface between the user and the RAID on memory may be SMPro or SMOR. Next, in operation 710, the DIMM is hot plugged. That is, the power to the DIMM is shut down while the system power is still on. Then, the DIMM is removed and replaced in operation 712, which is followed by operation 714 wherein the connection to the replaced DIMM is established. In operation 716, the data recovered in operation 706 is restored into the replaced DIMM, if such request has been made by the user.

Thus, data in one DIMM can be recovered implementing the hot plug feature of the present invention, beneficially eliminating the necessity to shut down the system power. In this manner, the loss of memory and the valuable time associated with shutting down the system as well as reconfiguring the system is reduced.

Figure 8:
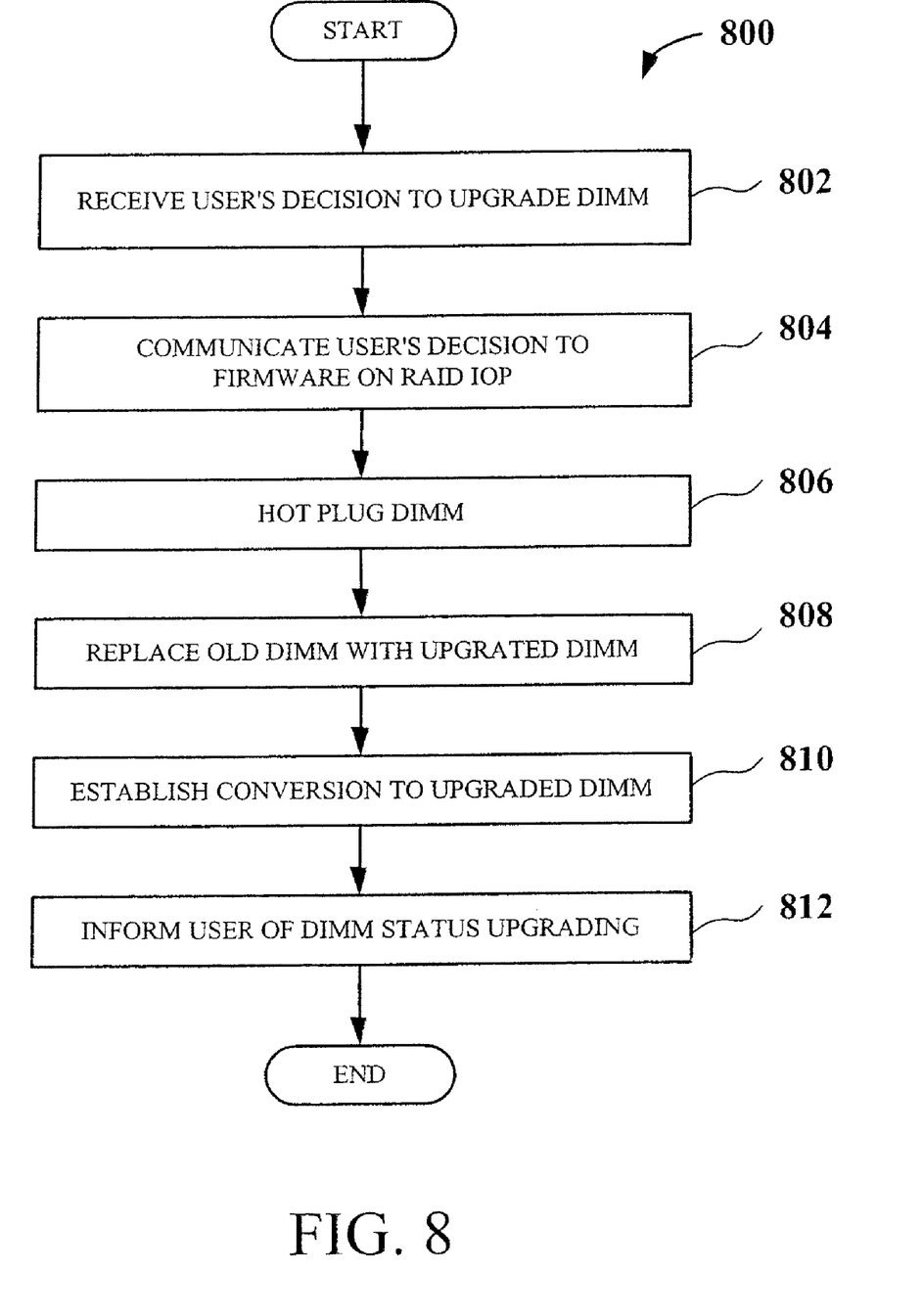
FIG. 8 is a flowchart diagram of method operations performed in upgrading a DIMM through hot plugging, in accordance with yet another embodiment of the present invention.

The method operations in upgrading a DIMM by hot plugging the DIMM is illustrated in the method operations of flowchart 800 depicted in FIG. 8, in accordance with one embodiment of the present invention. The method begins in operation 802 in which a user's decision to upgrade a DIMM is received. Next, in operation 804, the user's decision is communicated to the firmware defined on RAID IOP. In one example, the SMPro or SMOR software is used to provide interaction between the firmware and the user.

Continuing to operation 806, the selected DIMM is hot plugged. That is, the power connected to the selected DIMM is shut down. This is advantageous, as in contrast to the prior art, the embodiments of the present invention do not necessarily have to use the operating system, the drivers, and application layers to interact with the firmware so as to hot plug the DIMM That is, in the embodiments of the present invention, depending on the operating system environment, the user can implement the operating system and one of the RAID user interfaces to communicate with the firmware almost directly. Thus, the embodiments of the present invention advantageously enable a user to hot plug the DIMM rather than shutting down the entire system or the host adapter card.

In operation 806, the old DIMM is replaced with an upgraded DIMM. For instance, a DIMM having a 64 Mbytes memory size is upgraded to a DIMM having a 128 Mbytes memory size. Then, in operation 810, connection is established to the upgraded DIMM. That is, the firmware restores power to the replaced DIMM. Thereafter, in operation 812, the user is informed of the status of the upgraded DIMM. In one embodiment, SMPro or SMOR software interface is implemented to interact with the user.

Figure 9:
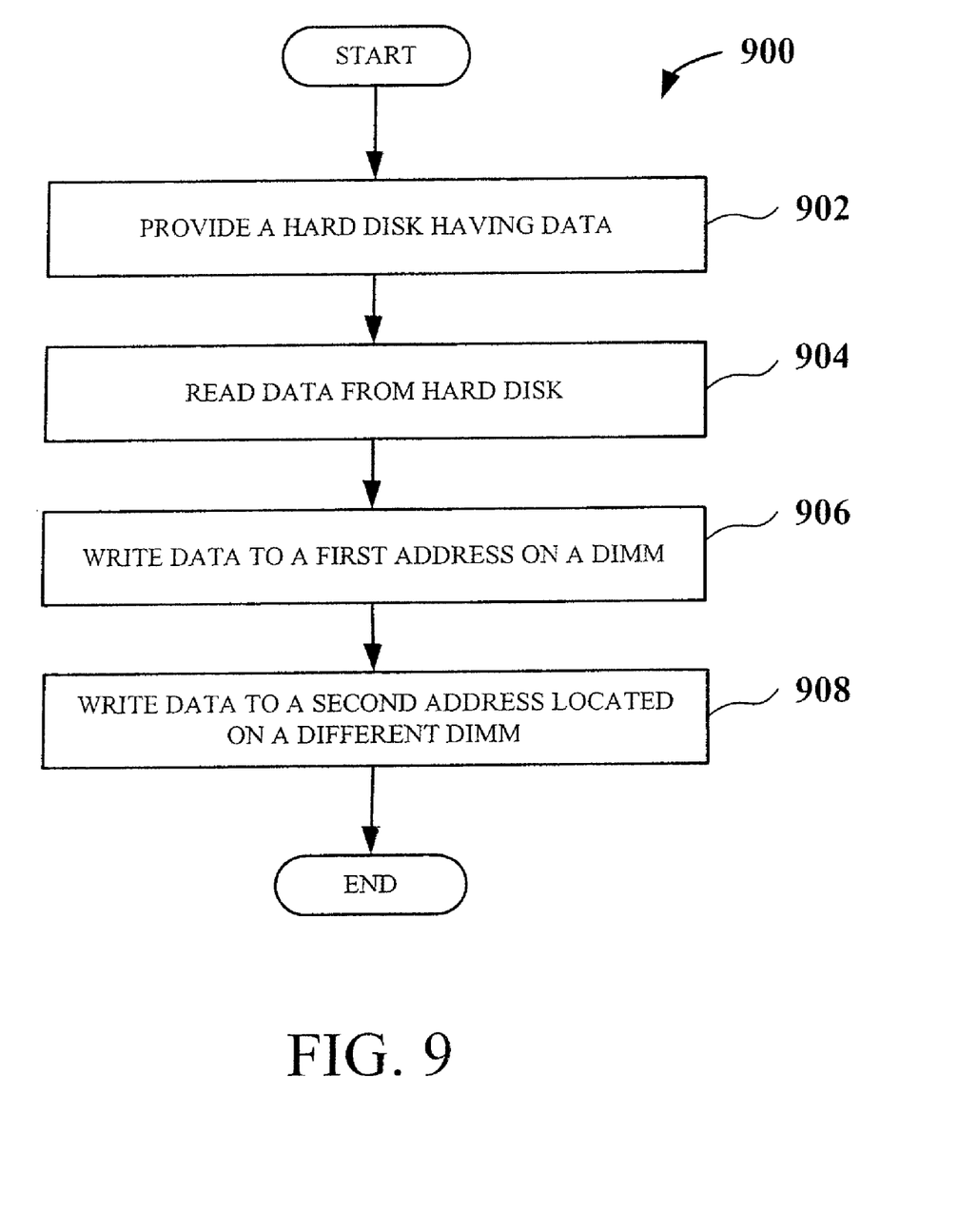
FIG. 9 is a flowchart diagram of method operations in performing a RAID level 1 on memory on a plurality of DIMMs, in accordance with yet another embodiment of the present invention.

FIG. 9 depicts the flowchart 900 of method operations performed in RAID level 1 on a plurality of DIMMs forming a RAID array of memory, in accordance with one embodiment of the present invention. The method begins in operation 902 in which a hard disk having data stored therein is provided. Next, in operation 904, a portion of data stored in the hard disk is read and is then written on a first address on a DIMM in operation 906. Proceeding to operation 908, the portion of data read in operation 904 is written to a second address located on a different DIMM. In this manner, data stored in a portion of a single hard disk drive is read and written into two DIMMs, increasing the reliability of data in a dedicated memory. In one example, using different addresses to write data is an indication of having physically different DIMMs.

FIGS. 10A-10G illustrate a plurality of exemplary Graphic User Interfaces (GUI) in a RAID On Memory Utility, in accordance with one embodiment of the present invention. In one example, upon booting the system, the RAID on Memory utility is initiated checking on substantially all DIMMs within the dedicated memory. As shown, the utility verifies the number of DIMMs in the system and provides the user with such information. Upon detecting the number of active DIMMs, using dialog boxes 1004 and 1006, the user is informed of the detection of the two DIMMs.

Figure 10A:
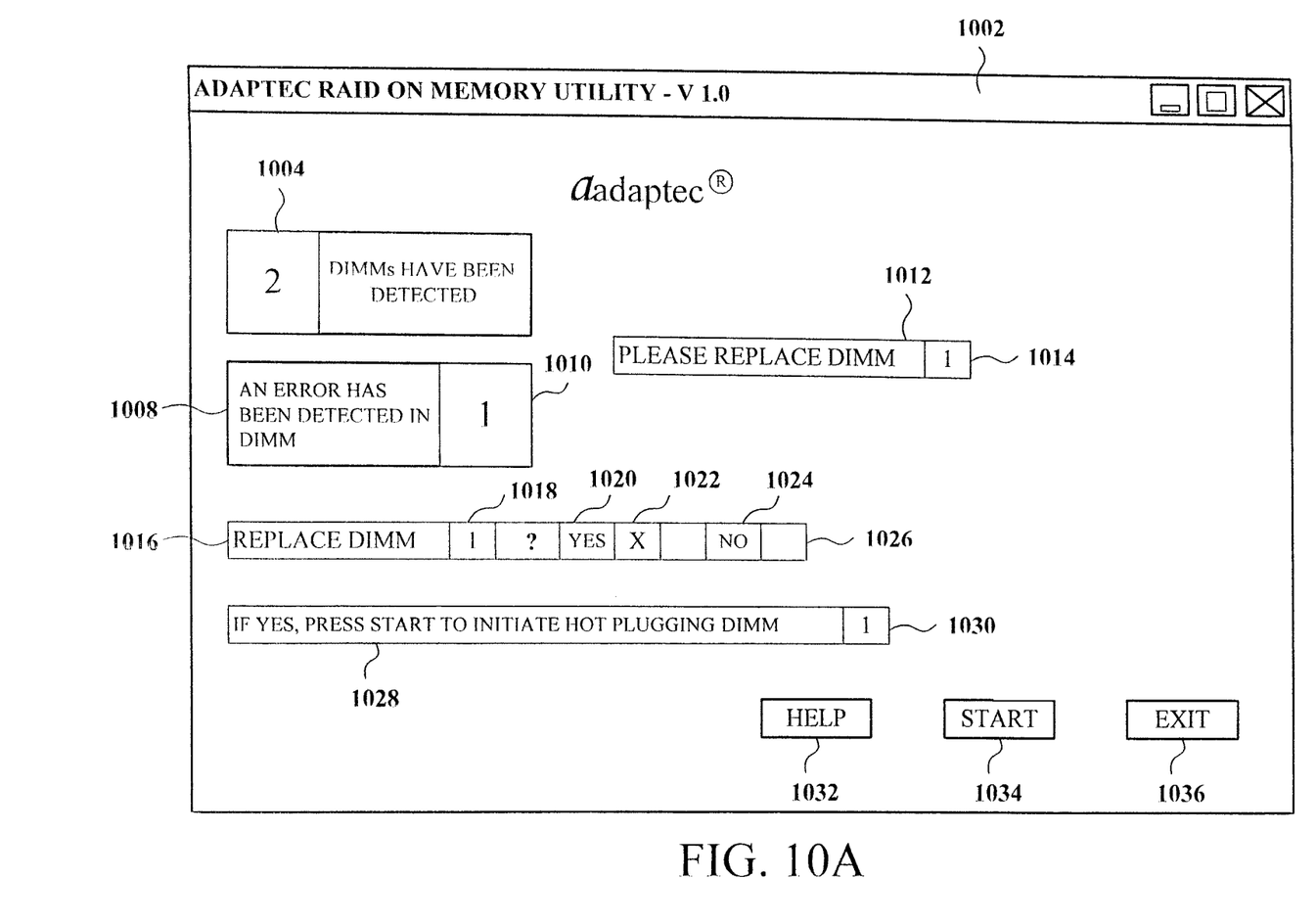
FIGS. 10A-10H illustrate a plurality of exemplary Graphic User Interfaces (GUI) in a RAID on Memory Utility, in accordance with yet another embodiment of the present invention.

Thereafter, continuing with the initialization process, in boxes 1008 and 1010, the user is informed of the detection of an error in DIMM 1. Using boxes 1012 and 1014, the user is informed as to the need to replace DIMM 1. Using boxes 1016-1026, the user is given an option to replace DIMM 1. As shown, in boxes 1020 and 1022, the user has selected to replace DIMM 1. In boxes 1028 and 1030, the user is given the option to initiate the hot plugging of DIMM 1. As shown, the user is given an option to either press the start button 1034 or an exit button 1036 to leave the RAID on Memory utility. The user is further given an opportunity to seek help using the help button 1032.

Figure 10B:
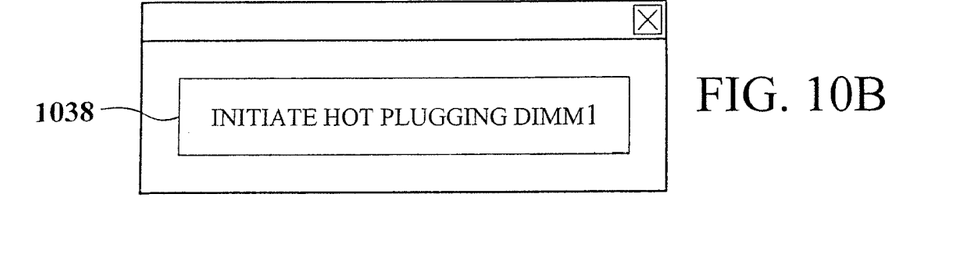
Figure 10C:
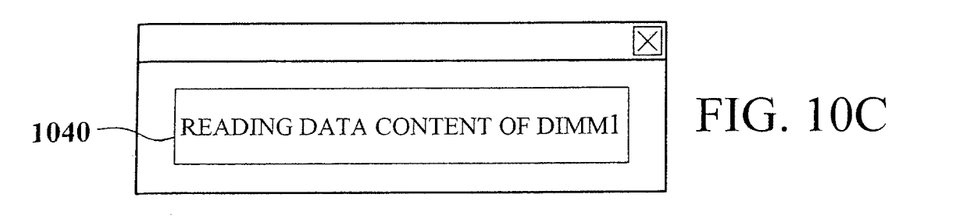
Figure 10D:
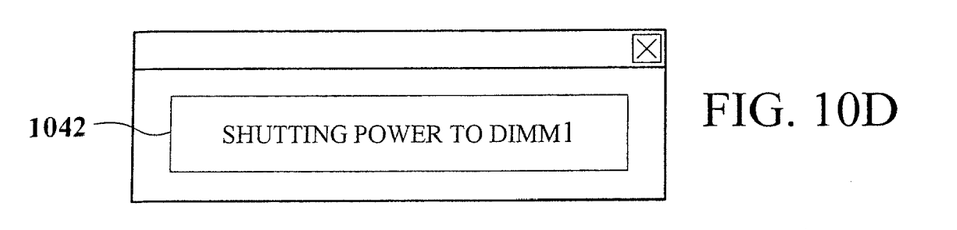
Figure 10E:
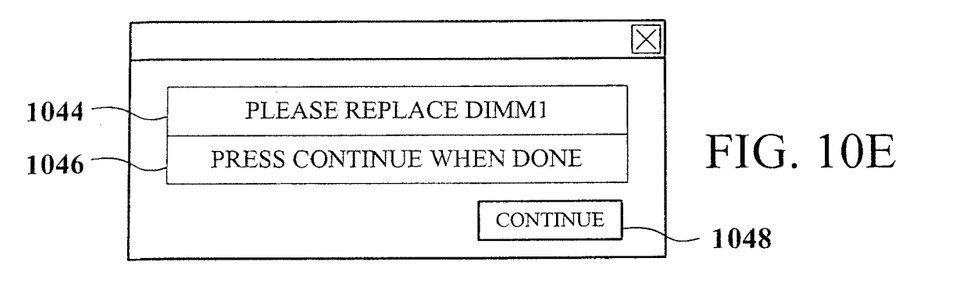
Figure 10F:
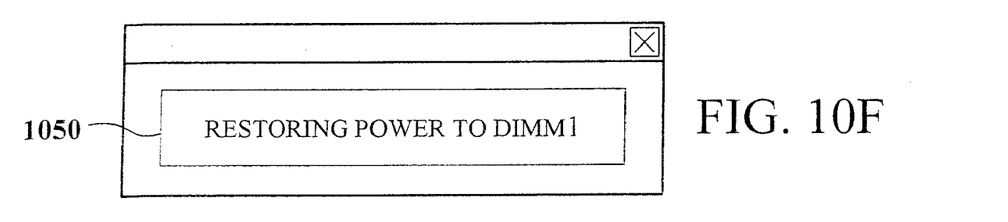
Figure 10G:
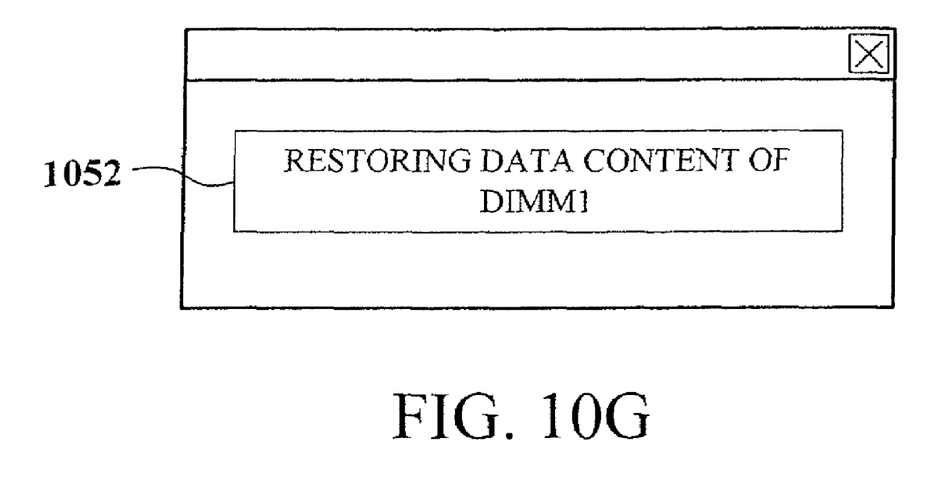
Figure 10H:
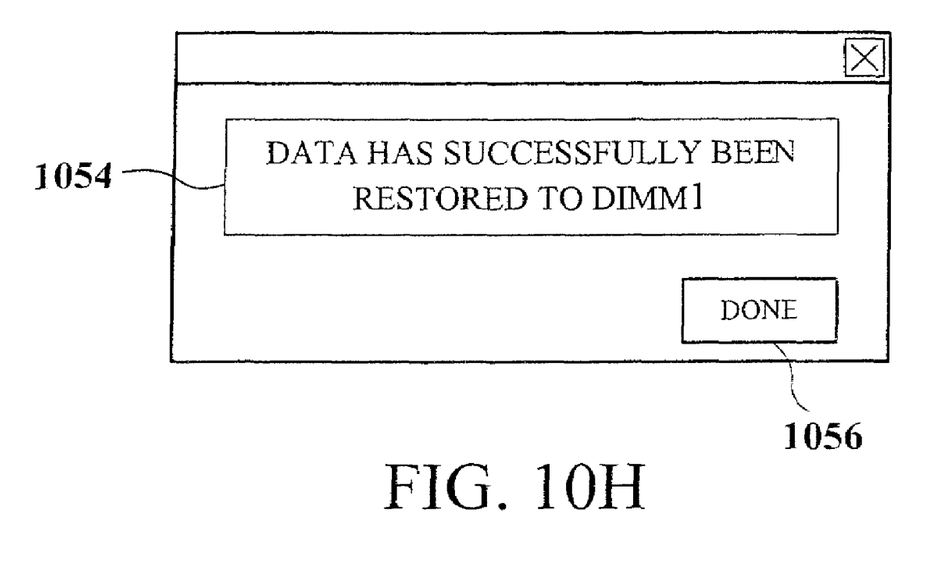

Continuing to FIG. 10B, the progress of the RAID on Memory utility is shown in further detail. Implementing the box 1038, the user is informed of the initiation of hot plugging of DIMM 1. Then, in box 1040 depicted in FIG. 10C, the user is informed that data content of DIMM 1 is read followed by a box 1042, in which the power is shut down to DIMM 1. Next, in box 1044, the user is instructed to replace DIMM 1 followed by a request in box 1046 requesting pressing of a continue button 1048. The power to DIMM 1 is then restored as shown in box 1050 of FIG. 10F. Following the restoring of power to DIMM 1, the data content of DIMM 1 is restored as shown in box 1052 of FIG. 10G. As shown in box 1054, the user is then informed of the successful restoring of data to DIMM 1 confirmed by a done button 1056.

It must be appreciated by one having ordinary skill in the art that the SCSI controller of the present invention may be integrated into a motherboard of computer systems as opposed to being on an adapter card. Additionally, the present invention may be implemented using an appropriate type of software driven computer-implemented operation. As such, various computer-implemented operations involving data stored in computer systems to drive computer peripheral devices (i.e., in the form of software drivers) may be employed. These operations are those requiring physical manipulation of physical quantities. Usually, though not necessarily, these quantities take the form of electrical or magnetic signals capable of being stored, transferred, combined, compared and otherwise manipulated. Further, the manipulations performed are often referred to in terms such as ascertaining, identifying, scanning, or comparing.

Any of the operations described herein that form part of the invention are useful machine operations. Any appropriate device or apparatus may be utilized to perform these operations. The apparatus may be specially constructed for the required purposes, or it may be a general purpose computer selectively activated or configured by a computer program stored in the computer. In particular, various general purpose machines may be used with computer programs written in accordance with the teachings herein, where it may be more convenient to construct a more specialized apparatus to perform the required operations.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for protecting memory, comprising:
reading a block of data from a storage drive;
writing the block of data to a first dual in-line module (DIMM) and a second DIMM plugged onto a single host adapter card coupled to the storage drive, wherein the first DIMM and the second DIMM are coupled to a single Redundant Array of Independent Disks (RAID) controller on the single host adapter card; and
managing the first DIMM and the second DIMM to protect the block of data, wherein the block of data can be recovered from a non-failing DIMM in case either the first DIMM or the second DIMM fails.

2. The method of claim 1, wherein the first DIMM and the second DIMM plugged onto the single host adapter card are protected by Redundant Array of Independent Disks (RAID).

3. The method of claim 2, wherein the first DIMM and the second DIMM are used in striping of data of RAID level 0.

4. The method of claim 2, wherein the first DIMM and the second DIMM are protected by a RAID level 1.

5. The method of claim 1, wherein the operation of managing the first DIMM and the second DIMM to protect the block of data is performed by a RAID Input/Output processor integrated on the single host adapter card.

6. The method of claim 1, wherein if either the first DIMM or the second DIMM is faulty, the faulty DIMM be replaced by another new DIMM by hot plugging.

7. The method of claim 1, wherein each of the first DIMM and the second DIMM is partitioned into multiple memory partitions.

8. The method of claim 1, wherein the first DIMM and the second DIMM are protected by a RAID level 5.

9. A system for increasing a performance and fault tolerance of a computer system, the system comprising:
   a set of storage drives configured to store data;
   a first DIMM and a second DIMM protected by Redundant Array of Independent Disks (RAID), wherein the first DIMM and the second DIMM are plugged onto a host adapter card; and
   a single RAID controller configured to store data in the set of storage drives into the first DIMM and the second DIMM, wherein the first DIMM and the second DIMM are coupled to the single RAID controller, the single RAID controller is further configured to redundantly protect data stored into the first DIMM and the second DIMM, and the single RAID controller is integrated on the host adapter card.

10. The system of claim 9, wherein the single RAID controller implements a RAID level 0 using the first DIMM and the second DIMM for striping of data.

11. The system of claim 9, wherein the single RAID controller implements a RAID level 1 to redundantly protect data stored into the first DIMM and the second DIMM.

12. The system of clam 9, wherein the single RAID controller includes a direct Memory access (DMA) engine configured to transfer data from the set of storage drives to the first DIMM and the second DIMM.

13. The system of claim 12, wherein the DMA engine has multi-channels to allow parallel transfer of data from the set of storage drives to the first DIMM and the second DIMM.

14. The system of claim 9, wherein the single RAID controller includes a firmware to virtually split each of the first DIMM and the second DIMM into multiple memory partitions.

15. The system of claim 9, wherein if either the first DIMM or the second DIMM is faulty, the faulty DIMM be replaced by another new DIMM by hot plugging.

16. The system of claim 9, the single RAID controller implements a RAID level 5 to redundantly protect data stored into the first DIMM and the second DIMM.

* * * * *